United States Patent
Yonezu et al.

(10) Patent No.: US 7,818,080 B2
(45) Date of Patent: *Oct. 19, 2010

(54) PROGRAM WRITING METHOD OF NUMERICAL CONTROLLER, NUMERICAL CONTROLLER AND CUTTING MACHINE CONTROLLED THEREBY

(75) Inventors: Toshihiro Yonezu, Nishio (JP); Hiroaki Sugiura, Toyota (JP); Satoshi Abeta, Chita (JP)

(73) Assignee: JTEKT Corporation, Osaka-shi (JP)

( * ) Notice: Subject to any disclaimer, the term of this patent is extended or adjusted under 35 U.S.C. 154(b) by 503 days.

This patent is subject to a terminal disclaimer.

(21) Appl. No.: 11/852,725

(22) Filed: Sep. 10, 2007

(65) Prior Publication Data

US 2008/0177407 A1 Jul. 24, 2008

(30) Foreign Application Priority Data

Sep. 28, 2006 (JP) ............................. 2006-265050
Sep. 28, 2006 (JP) ............................. 2006-265051

(51) Int. Cl.
*G06F 19/00* (2006.01)
(52) U.S. Cl. ............................................ 700/95; 451/1
(58) Field of Classification Search .................. 700/95, 700/117, 159, 160, 167, 172, 186–187, 190, 700/191, 195; 409/1, 64; 408/62, 69–71; 82/1, 11, 106, 109; 451/1, 5, 11, 27, 121, 451/123, 136, 140, 142, 144, 177, 178
See application file for complete search history.

(56) References Cited

U.S. PATENT DOCUMENTS

| | | | |
|---|---|---|---|
| 4,848,038 A | | 7/1989 | Maruyama et al. |
| 6,601,484 B1 * | | 8/2003 | Katoh et al. .................. 82/1.11 |
| 6,606,528 B1 * | | 8/2003 | Hagmeier et al. ............. 700/98 |
| 6,672,184 B2 * | | 1/2004 | Ogawa et al. ................. 82/106 |
| 6,804,575 B2 * | | 10/2004 | Sagawa et al. ............... 700/181 |
| 6,819,974 B1 * | | 11/2004 | Coleman et al. ............ 700/195 |

(Continued)

FOREIGN PATENT DOCUMENTS

JP 63-84845 4/1988

(Continued)

OTHER PUBLICATIONS

U.S. Appl. No. 11/944,794, filed Nov. 26, 2007, Yonezu, et al.

*Primary Examiner*—Kidest Bahta
(74) *Attorney, Agent, or Firm*—Oblon, Spivak, McClelland, Maier & Neustadt, L.L.P.

(57) ABSTRACT

It is one object of the present invention to provide a program writing method of numerical controller, a numerical controller and a cutting machine controlled thereby, achieving the writing of a plurality of programs relating to one axis to perform a high efficiency in a lot of productions. A next or later user-set-program controlling a duplicated axis controlled by plural user set programs identifies a virtual axis virtually controlled by one user set program. A program is written to replace the duplicated axis with the virtual axis. A control amount calculated by the user set program identifying the virtual axis is added to a control amount inputted to a correspondent axis driving program as a control amount of the duplicated axis before replacing the virtual axis.

16 Claims, 10 Drawing Sheets

40: NUMERICAL CONTROLLER
41: CPU
42: MEMORY
43: INPUT DEVICE
51–54: DRIVING UNIT

Z-AXIS DIRECTION
X-AXIS DIRECTION

U.S. PATENT DOCUMENTS

| | | | |
|---|---|---|---|
| 6,858,125 B2 * | 2/2005 | Wei et al. | 205/652 |
| 7,118,453 B2 * | 10/2006 | Hori et al. | 451/11 |
| 7,510,587 B2 * | 3/2009 | Lee et al. | 55/428 |
| 2004/0185760 A1 * | 9/2004 | Weatherly et al. | 451/340 |
| 2008/0050192 A1 * | 2/2008 | Suzuki | 409/84 |

FOREIGN PATENT DOCUMENTS

| JP | 2001-277072 | 10/2001 |
|---|---|---|

* cited by examiner

40: NUMERICAL CONTROLLER
41: CPU
42: MEMORY
43: INPUT DEVICE
51 – 54: DRIVING UNIT

PROGRAM WRITING METHOD OF NUMERICAL CONTROLLER, NUMERICAL CONTROLLER AND CUTTING MACHINE CONTROLLED THEREBY

INCORPORATION BY REFERENCE

The present application claims priority under 35 U.S.C. §119 to Japanese Patent Applications No. 2006-265050, filed on Sep. 28, 2006 and No. 2006-265051, filed on Sep. 28, 2006. The content of these applications are incorporated herein by reference in their entirety.

BACKGROUND OF THE INVENTION

1. Field of the Invention

The present invention relates to a program writing method of numerical controller, a numerical controller and a cutting machine controlled thereby, especially achieving to control plural axes by plural control programs.

2. Description of the Related Art

It is well known that there are several cutting machines and cutting methods for cutting portions of a workpiece rotatably supported by a headstock and a tailstock. Where a complete circle is formed on a peripheral profile of the cut portions of the rotated workpiece, it is performed relatively simple cutting to infeed gradually a cutting tool toward the workpiece in a perpendicular direction (hereinafter called as "X-axis direction or X-axis") to a rotated axis (hereinafter called as "C-axis direction or C-axis") of the workpiece.

However, where a cut position of the peripheral of the workpiece is variable according to a rotational angular position of the workpiece such as non-circular cam surface of a cam shaft, a crankpin of a crankshaft, and so on, it needs quite complex cutting to infeed and retract the cutting tool toward and away from the workpiece along the X-axis according to the rotational angular position of the supported workpiece around the C-axis, so called as a C-X profile motion. The "C-X profile motion" is hereinafter defined as the infeed and retract movement of the cutting tool along the X-axis (perpendicular to the C-axis) according to the rotational angular position around the C-axis of the supported workpiece.

Prior arts are disclosed in next two distributed Japanese Patent publication of Tokkaisho 63-84845 and Tokkai 2001-277072. The former publication discloses the cutting method for the non-circular workpiece for grinding the cam to infeed the cutting tool by the amount of predetermined distances (ΔX) at short angular distances of one revolution of the cam shaft around the C-axis with the C-X profile motion.

The remainder publication discloses the machine tool to input only a value of a compensated parameter except for compensating all original parameters of a pin diameter and a pin stroke of the crankshaft, a diameter of the base portion of cam, and so on where the C-X profile motion is achieved based on the original parameter relating to a distance between the cutting tool and the workpiece according to the rotational angular position of supported workpiece around the C-axis.

It is well known conventional method, as shown in FIG. 1, to transfer and print the profile of a cutting tool 30, in this example the grinding wheel, to an arc recess portion of the workpiece 10 having both end portions 11A and 11C whose diameter of a circumferential surface are gradually larger to form an arc profile, and a central portion 11B whose diameter of the circumferential surface is same. In this conventional method, a width 30W of the cutting tool 30 is almost equal to a longitudinal distance 11W of the crankpin 11 and the profile of the circumferential surface 30A, 30B, 30C of the cutting tool 30 is transferred and copied to the profile of the circumferential surface 11A, 11B, 11C after cutting the workpiece 10 by the cutting tool 30. On this cutting method of the workpiece 10 shown in FIG. 1, the profile of the cutting tool is pre-formed before cutting.

This conventional cutting method is performed by a numerical controller using a program. Plural programs are shown in FIG. 3 and a user-set-program (hereinafter called as user set program) is written as shown in FIG. 3. In FIG. 3, the program comprises a group of user set programs having single or plural user set programs and a group of axis driving programs prepared for each of driven axes. The axis driving program is input an amount of output command (hereinafter called as a control amount) output from a CPU of the numerical controller to a driving unit and the control amount is calculated by the user set program.

The user set program is written a program to calculate the control amount for single or plural axes identified by a user or an operator arbitrarily and therefore the user is free to write the user set program.

The axis driving program is prepared to drive the driving unit for the actual axis, that is a driving motor, and therefore it is corresponded to each of driving units.

Each of driving units is input the control amount (output command) from the correspondent axis driving program and controls in a feedback mode to compensate a difference between an output command and a position or rotational angle et al based on a detected signal from a correspondent position detector.

Where there are a plurality of user set programs, the CPU performs each of user set programs independently and in parallel. The control amount calculated by each of user set programs is input to an axis output program in parallel. Thereby, plural user set programs are simultaneously performed and each axis is controlled simultaneously.

Besides, each axis is identified by only one user set program individually. Therefore, where there are two user set programs PU1, PU2, the user can not identify the X-axis nor the C-axis to calculate the control amount in user set program US2 after the user has identified the X-axis and the C-axis in the user set program US1 to calculate the control amount.

As shown in FIG. 2, the CPU of the numerical controller reads a step N010 and recognizes an identification of a C-X profile motion start mode based on "G51" where "G51" is pre-registered as the C-X profile motion start mode. And also the CPU commands to rotate the crankshaft 10 at 60 rounds per minutes based on the "S60" and it recognizes an command to control a wheel head driving motor to position the surface of the grinding wheel 30 at the position along the X-axis according to the rotational angular position around the C-axis based on datum of the rotational angular position around the C-axis and the position along X-axis registered in a file "P2345" and it also calculates the control amount around C-axis and the control amount along X-axis.

The CPU of the numerical controller reads a next step N020 shown in FIG. 2, it recognizes an infeed mode based on "G01" where "G01" is pre-registered as the infeed mode and recognizes outside positioning mode according to a measured dimension based on "G31" by a sizing device that measures the dimension of the ground portion of the workpiece where "G31" is pre-registered as the outside positioning mode. And the CPU recognizes relative position command mode based on "G91 x−0.2 F1." where G91 is pre-registered as the relative position command mode and recognizes the command to infeed the grinding wheel 30 along the X-axis in the amount of 0.2 mm by the infeed speed of 1 mm/min, calculates the control amount of the wheel head along X-axis. The amount of "−0.2" means that the grinding wheel 30 is infed toward the crankshaft 10 at the amount of 0.2 mm. The CPU sums the control amount calculated in Step N010 and the control amount calculated in Step N020 to input the resulted amount to an X-axis driving program Pjx. The control amount around C-axis calculated in Step N10 is input to a C-axis driving program Pjc.

Then, the CPU reads a next Step N030 based on an output signal from the sizing device where the output signal is shown in an address 98765.

Next, the CPU reads the Step N030 and recognizes both of the infeed mode and outside positioning command mode based on "G01" and "G31". Then, it recognizes relative positioning command mode according to "G91" based on "G91 x-0.02 F0.5" and recognizes the command to infeed the wheel head along the X-axis at the amount of 0.02 mm in the infeed speed 0.5 mm/min, calculating the control amount of the wheel head along X-axis. The CPU sums the control amount calculated in Step N010 and the control amount calculated in Step N030 to input the resulted amount to the X-axis driving program Pjx. The control amount around C-axis calculated in Step N10 is input to the C-axis driving program Pjc.

Then, the CPU reads a next Step N040 based on an output signal from the sizing device where the output signal is shown in an address 98764.

Next, the CPU reads a Step N040 and recognizes a sparkout mode based on "G04" where "G04" is pre-registered as the sparkout mode. And, it recognizes the command to perform the sparkout motion at single revolution around the C-axis based on "P1". The "sparkout" means to position the surface of the grinding wheel to the preset infeed position during stopping the infeed motion of the wheel head in order to perform a sparkout grinding based on a spring back of the workpiece because of the lack of rigidity of a wheel spindle and the workpiece during grinding, causing a final motion to make a smooth surface of the workpiece.

After the CPU performed the sparkout motion at the single revolution, it reads a Step N050 and recognizes a profile motion termination mode based on "G50" where the "G50" is pre-registered as the profile motion termination mode and it stops the C-X profile motion along the X-axis and around the C-axis.

FIG. 4B shows a position chart of the conventional grinding wheel 30 according to the motion "to infeed the cutting tool by the amount of predetermined distances (ΔX) at short angular distances of one revolution of the cam shaft around the C-axis with the C-X profile motion between the C-axis and the X-axis" disclosed in the former publication of Tokkaisho 63-84845. A vertical axis shows the grinding wheel position equaling to a distance between centers of the grinding wheel 30 and the crankshaft 10 and a lateral axis shows the rotational angle of the crankshaft 10 and 2π means one revolution.

On the other hand, FIG. 4A shows the position chart of the conventional grinding wheel 30 during only the C-X profile motion of the C-axis and X-axis without the infeed motion.

As explained the operation of the conventional method, in FIG. 2 is written the C-X profile motion of the C-axis and the X-axis and the infeed motion along X-axis in one user set program. By this operation, as shown in FIG. 4A, it is repeated for the conventional method to infeed the grinding wheel 30 by the predetermined amount of the infeed at short angular distances of one revolution of the cam shaft around the C-axis and this short angular distances is α shown in FIG. 4B. The amount of the infeed is zero during the angular distance β.

The sizing device can not detect any alteration of the profile of the workpiece during the infeed motion so that it should prepared to make less affection of the load changes to the workpiece by shortening times of the infeed motion. In the former publication, however, because the infeed motion is achieved during relatively short distances in a step mode, rapid grinding load occurs so that it should be prepared to set the proper infeed amount and the proper infeed distances, therefore there is an probability to occur any problems to make a roundness worse and to generate a step on the ground surface of the workpiece etc. and another problems to make a consumption of cutting tool larger and its life time shorter.

In the above explained prior art for cutting the crankpin 11 as shown in FIG. 1, it is conventional way to perform the combined method of the transferring and printing method and the contents disclosed in the former publication of Tokkaisho 63-84845 or to perform the combined method of the transferring and printing method and the contents disclosed in the remainder publication of Tokkai 2001-277072.

However, the former publication makes the above-mentioned problem, and the transferring and printing method of the cutting tool 30 needs more labourer to re-dress the profile of the cutting tool 30 in order to re-fit the changed workpiece or to change the cutting tool 30 in a small lot of productions or in the large size of the changed workpiece.

Therefore, the inventors of the present invention think to adjust the change of the profiles and sizes of the crankpin without transferring and copying of the cutting tool 30 if it is achieved to move the cutting tool 30 along the arc profile of the crankpin in Z-axis and X-axis with the C-X profile motion by using the cutting tool having the smaller width 30W compared to a length 11A of the crankpin 11, as shown in FIG. 7. Based on the writing method of the conventional programming, however, it can not write in relation to one axis, for example the X-axis, a plurality of programs of the movement along the X-axis of the C-X profile motion with the movement along X-axis relative to the rotational angular movement around the C-axis, the movement of the infeed motion along the X-axis to grind to a desired size of the diameter of the crankpin, and a movement along the X-axis with the movement along the Z-axis fitting to the arc profile of the crankpin.

SUMMARY OF THE INVENTION

In view of the previously mentioned circumstances, it is an object of the present invention to provide a program writing method of numerical controller, a numerical controller and a cutting machine controlled thereby achieving to write a plurality of programs relating to one axis to perform a high efficiency in the small lot of productions.

It is second object of the present invention to provide a program writing method of numerical controller, a numerical controller and a cutting machine controlled thereby to infeed a cutting tool continuously and evenly in spite of a rotational angle of a workpiece along the one axis written in plural user set programs.

It is third object of the present invention to provide a program writing method of numerical controller, a numerical controller and a cutting machine controlled thereby to separate a cutting tool temporally from the workpiece relatively along the one axis written in plural user set programs.

It is fourth object of the present invention to provide a program writing method of numerical controller, a numerical controller and a cutting machine controlled thereby to perform a filtering process in order to change an infeed speed of a cutting tool relatively to a workpiece along the one axis written in plural user set programs.

In order to achieve the above and other objects, one aspect of the present invention provides a program writing method of numerical controller, a numerical controller and a cutting machine to identify a virtual axis virtually controlled by a own user set program in a next or second user set program controlling a duplicated axis controlled by plural user set programs, and to add a control amount calculated by user set program identifying the virtual axis to a related axis driving program as a control amount of the duplicated axis before the replacement to the virtual axis. Thereby, it is possible to write a plurality of user set programs in relation to one axis.

Second aspect of the present invention is that the cutting machine mainly comprises a sizing device to size the cut workpiece continuously in spite of a rotational angle of the workpiece around said C-axis, and the user set program relating to the X-axis to write a command to infeed continuously and evenly the cutting tool relatively to the workpiece at any angular position of the workpiece at a first speed until the size of the cut workpiece reaches a first predetermined amount based on a signal from the sizing device. Thereby, it is restrained to occur a deterioration of circularity and the generation of the step on the cut surface of the workpiece so that this performs to finish in higher accuracy of the cut surface. And also, this reduces the cutting load by infeeding continuously and evenly to reduce the consumption of the cutting tool.

Third aspect of the present invention is that the cutting machine mainly comprises the user set program relating to the X-axis writing a command to infeed continuously and evenly the cutting tool relatively to the workpiece at any angular position of the workpiece at a second slower speed than the first speed until the size of the cut workpiece reaches a second predetermined amount smaller than the first predetermined amount based on the signal from the sizing device after the size of the workpiece reaches to the first predetermined size, the user set program relating to the X-axis further writes a command to retract the cutting tool relatively to the workpiece along the X-axis in order to separate the cutting tool from the workpiece temporally after the size of said workpiece reaches to the first predetermined size before infeed of the cutting tool at the second speed. Thereby, this results an elimination of a deflection et al of the workpiece by the back off motion to separate temporally the cutting tool from the workpiece to make the ground accuracy high.

Fourth aspect of the present invention is that the control amount calculated by the user set program relating to the X-axis is added to the control amount input to the X-axis driving program after a filtering process to the control amount calculated by the user set program relating to the X-axis in order to change gradually from the first speed to the second speed to cut the workpiece by the cutting tool. Thereby, this results higher accuracy of the ground surface by changing the infeed speed smoothly at the changing point of the infeed speed from the first speed to the second speed.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Figure 5:
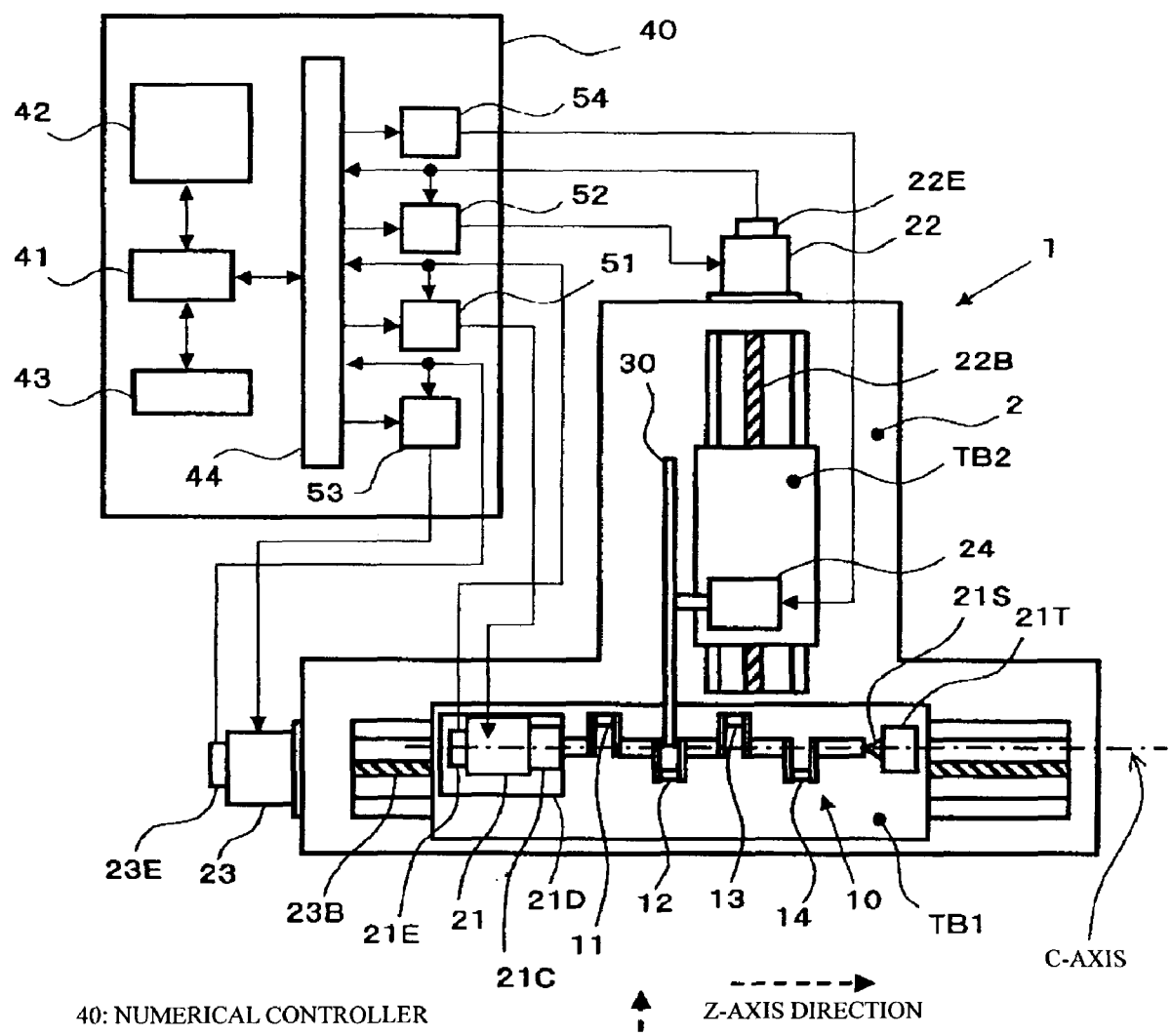
FIG. 5 is a schematic diagram of the numerical controller and a cutting machine according to a first embodiment of the present invention.

A preferred embodiment of the program writing method of numerical controller, the numerical controller and the cutting machine controlled thereby according to the present invention will be described referring to FIG. 5 to FIG. 10. FIG. 5 shows the first embodiment of the present invention of the numerical controller 40 and the cutting machine 1, especially a grinding machine 1. Besides, the numerical controller 40 and the cutting machine 1 is the same one to the conventional numerical controller and the cutting machine but it achieves non-realized cutting method by the conventional cutting method by the way of writing programs of the numerical controller of the present invention.

First Embodiment of the Present Invention

In the first embodiment of the present invention is explained the writing method of the plural user set programs that is not realized by the conventional writing method and an identification of each of independent motions in controlling at least one axis in the numerical controller. The user set program will be explained hereinafter.

[Cutting Machine 1 and Numerical Controller 40]

The cutting machine provides a base 2, a workpiece table TB1, a wheel table TB2 and the numerical controller 40.

Figure 7:
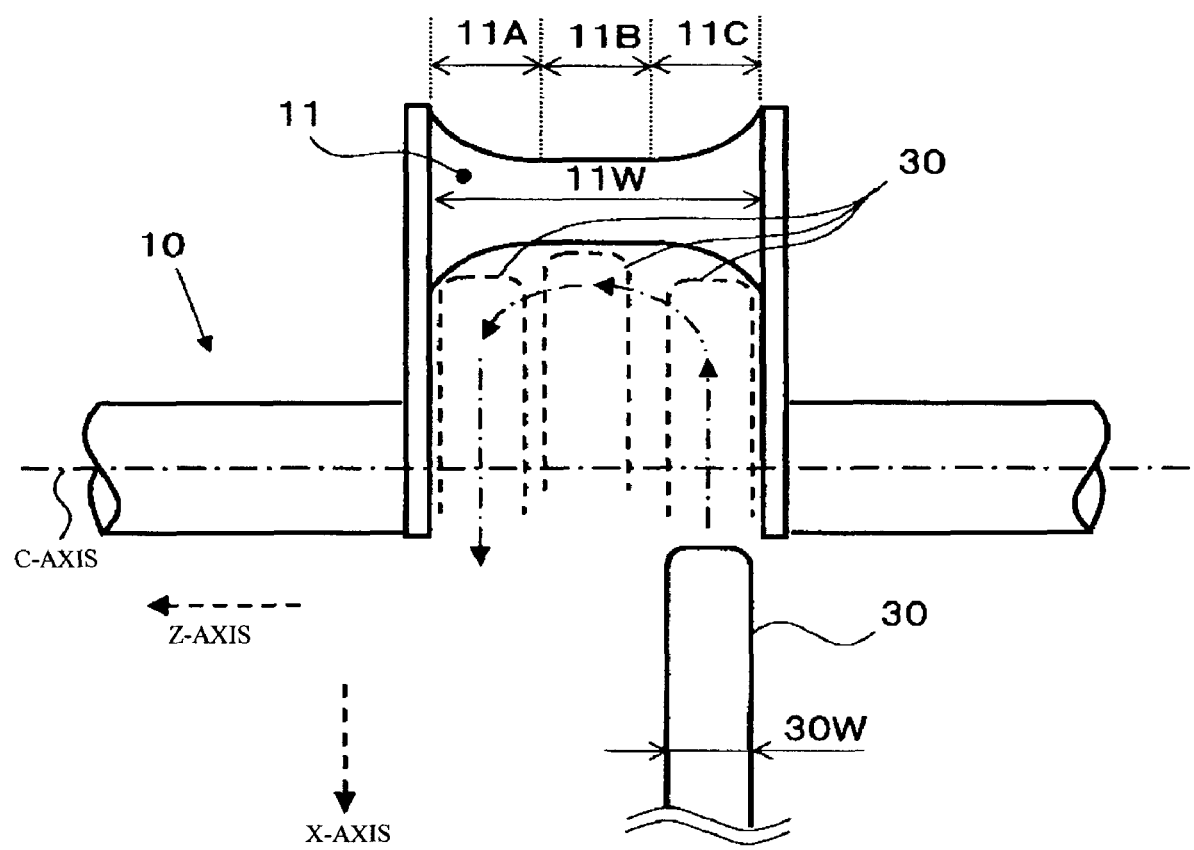
FIG. 7 is a schematic diagram of the cutting method according to the embodiment of the present invention.

The wheel table TB2 has an approximately cylindrical grinding wheel 30 correspondent to the cutting tool. The grinding wheel 30 is rotated around a rotational axis parallel to the Z axis by a wheel rotational driving motor 24 mounted on the wheel table TB2. A width 30W of the grinding wheel 30 parallel to the rotational axis is smaller than a length 11W of the crankpin 11 along to the Z-axis as shown in FIG. 7. Besides, the Z-axis is parallel to the C-axis around which the crankshaft 10, correspondent to the workpiece, is supported and rotated by a spindle motor 21 and the Z-axis is a feed screw 23B explained hereinafter.

The wheel table TB2 is relatively movable to a base 2 along the X-axis by a wheel table driving motor 22, a feed screw 22B and an unillustrated nut. The wheel table driving motor 22 is correspondent to the X-axis driving motor mounted on the base 2 and said unillustrated nut is mounted on the wheel table TB2. Besides, the X-axis is perpendicular to the C-axis and the feed screw 22B is the X-axis.

The work table TB1 is relatively movable to the base 2 along the Z-axis by a workpiece table driving motor 23, the feed screw 23B and an unillustrated nut. The workpiece table driving motor 23 is correspondent to the Z-axis driving motor mounted on the base 2 and said unillustrated nut is mounted on the work table TB1.

On the work table TB1 is mounted a tail stock 21T, and a head stock 21D is also mounted to face the tail stock 21T in order to be movable toward and away from the tail stock 21T and to adjust various lengths of the workpiece. Each of supporting portions 21C, 21S, for example a chuck, is mounted on the head stock 21D and the tail stock 21T individually and the crankshaft 10 is supported on and between the supporting portions 21C and 21S. The C-axis is the axis combined the supporting portions 21C and 21S.

The crankshaft 10 is rotated around the C-axis with the supporting portions 21C and 21S by the spindle motor 21. The crankshaft 10 is also formed a plurality of crankpins 11, 12, 13, 14 having its center eccentric to the C-axis.

A position detect sensor 22E is mounted on the wheel table driving motor 22 to detect a position of the wheel table TB2 along the X-axis, a position detect sensor 23E is mounted on the workpiece table driving motor 23 to detect a position of the workpiece table TB1 along the Z-axis and a position detect sensor 21E is mounted on the spindle motor 21 to detect a rotational angle of the crankshaft 10. Various kinds of position detect sensors are used and an encoder is used in the first embodiment of the present invention.

The numerical controller 40 is comprised a CPU 41, a memory 42, an input and output device 43, for example keyboard, monitor, etc. an interface 44, and driving units 51-54. The numerical controller 40 controls the spindle motor 21, the wheel table driving motor 22, workpiece table driving motor 23 and wheel rotational driving motor 24 based on cutting datum and cutting programs and so on.

The CPU 41 calculates amounts of an output command to output them to the interface 44 based on programs and datum registered in the memory 42 and based on outside input signals input from through the interface 44.

These outside input signals are a signal from the position detect sensor 21E detecting the rotational angle of the crankshaft 10, a signal from the position detect sensor 22E detecting the position of the wheel table TB2 along the X-axis, a signal from the position detect sensor 23E detecting the position of the workpiece table TB1 along the Z-axis and so on.

These amounts of the output command are ones of the rotational angle of the crankshaft 10, the position of the wheel table TB2 along the X-axis, the position of the workpiece table TB1 along the Z-axis, a control amount controlling a rotational number of the wheel rotational driving motor 24 in order to cut the crankshaft 10. These amounts are output to driving units 51-54 through the interface 44.

The driving unit 51 controls the spindle motor 21 to control a rotational speed of the crankshaft 10 around the C-axis. The driving unit 52 controls the wheel table driving motor 22 to control the position of the wheel table TB2 along the X-axis. The driving unit 53 controls the workpiece table driving motor 23 to control the position of the workpiece table TB1 along the Z-axis. The driving unit 54 controls the wheel rotational driving motor 24 to control a rotational speed of the grinding wheel 30.

These driving units 51, 52, 53 control in feedback way to compensate a difference between the detect signals input from the position detect sensor 21E, 22E, 23E and amounts of output command from the CPU individually to control the spindle motor 21, the wheel table driving motor 22, and the workpiece table driving motor 23.

Besides, one example shown in FIG. 5 does not equip a detect sensor for the wheel rotational driving motor 24, however it may be equipped a speed detect sensor on the wheel rotational driving motor 24 in order to control in feedback way the rotational speed of the wheel rotational driving motor 24.

For one important point of another example of the first embodiment of the present invention, the cutting machine 1 equips an unillustrated sizing device that can detect continuously ground sizes of the workpiece by outputting the detect signal to be detected the ground size of the workpiece by the way of following the ground portion of the workpiece rotated around the C-axis in real time. The numerical controller can recognizes continuously the actual size of the ground portion in real time according to the detect signal from the sizing device.

[C-X Profile Motion of the Crankshaft 10 and the Grinding Wheel 30]

Figure 6A:
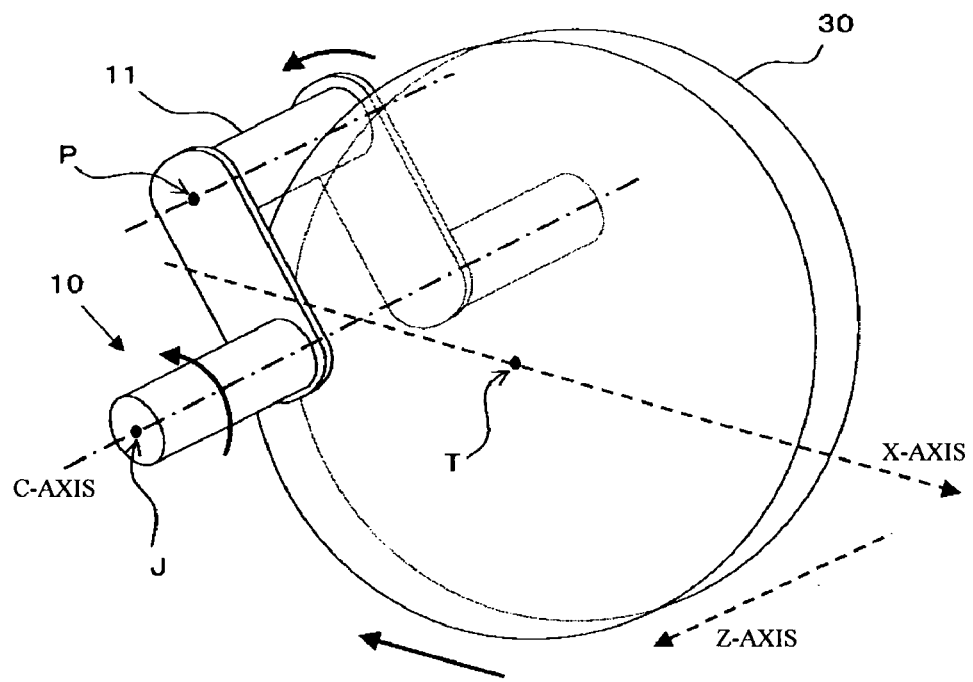
FIG. 6A shows the C-X profile motion to advance and retract the grinding wheel along the X-axis according to the rotational angle around the C-axis, wherein the position of the ground peripheral portion of the crankshaft along the X-axis is variable according to the rotational angle when the crankshaft is rotated around the C-axis.
Figure 6B:
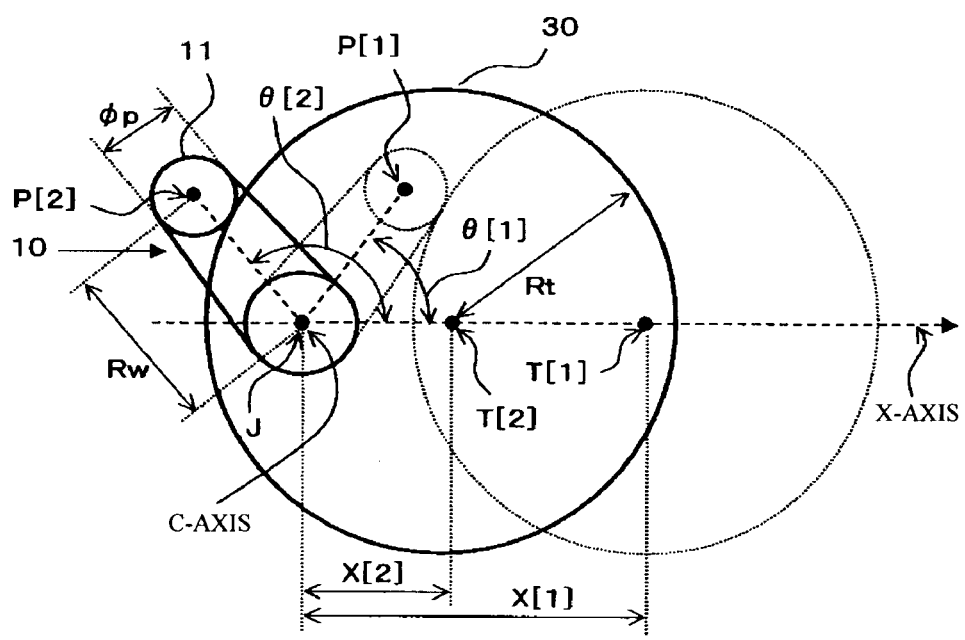
FIG. 6B shows the C-X profile motion to advance and retract the grinding wheel along the X-axis according to the rotational angle around the C-axis, wherein a point J is a center of the crankshaft, a point P is a center of s shaft of the crankpin, a point T is a rotational center of the grinding wheel, $\phi p$ is a diameter of the crankpin, Rw is a length of the straight line between the point J and the point P to be identified as a pin stroke, Rt is a radius of the grinding wheel.

In FIGS. 6A, 6B is explained the C-X profile motion to advance and retract the grinding wheel 30 along the X-axis according to the rotational angle around the C-axis.

As shown in FIG. 6A, the position of the ground peripheral portion of the crankshaft 10 along the X-axis is variable according to the rotational angle when the crankshaft 10 is rotated around the C-axis.

As shown in FIG. 6B, a point J is a center of the crankshaft 10, a point P is a center of s shaft of the crankpin 11, a point T is a rotational center of the grinding wheel 30, $\phi p$ is a diameter of the crankpin 11, Rw is a length of the straight line between the point J and the point P to be identified as a pin stroke, Rt is a radius of the grinding wheel 30. The point J and the point T are set on the straight line parallel to the X-axis.

Where the rotational angle $\theta$ of the workpiece is formed by the straight line combined the points J, P and the straight line combined the points J, T and a distance X is formed between the point J and the point T, the distance X is function of the rotational angle θ. The distance X means an advancing and retracting position relative to the rotational angle of the workpiece.

[Cutting Method, Writing Example of the User Set Program and its Practice to the Axis Driving Program According to the First Embodiment of the Present Invention]

Figure 1:
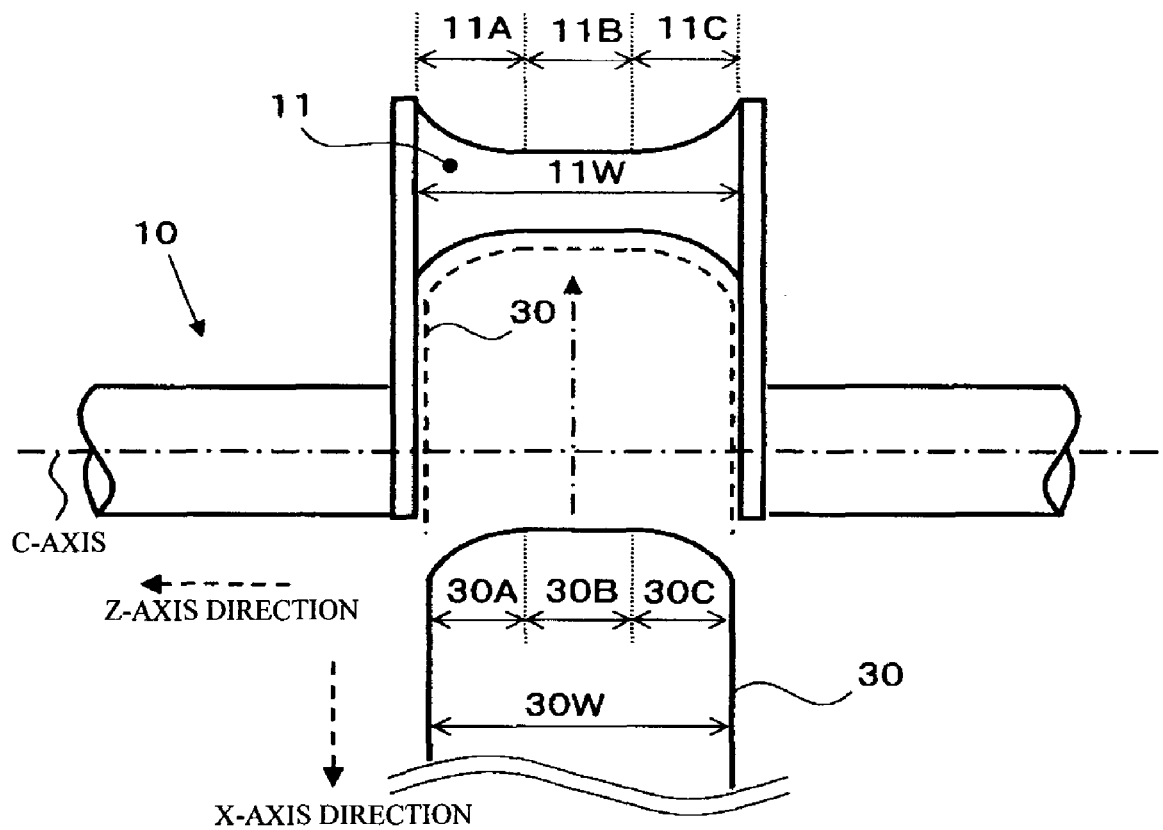
FIG. 1 is a schematic diagram of the conventional cutting method of the transferring and copying of the profile of the cutting tool.
Figure 2:
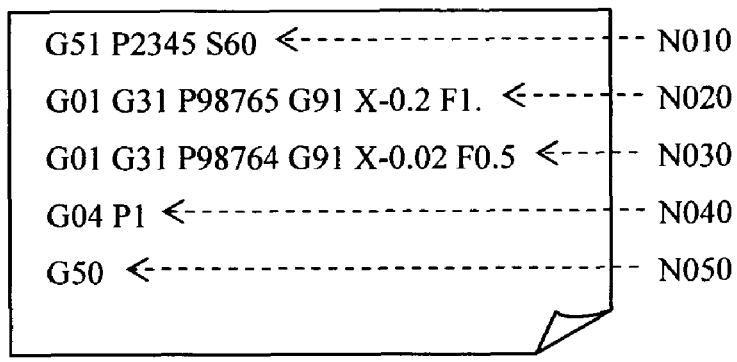
FIG. 2 is an explanatory diagram to write the user set program according to the conventional cutting method.
Figure 3:
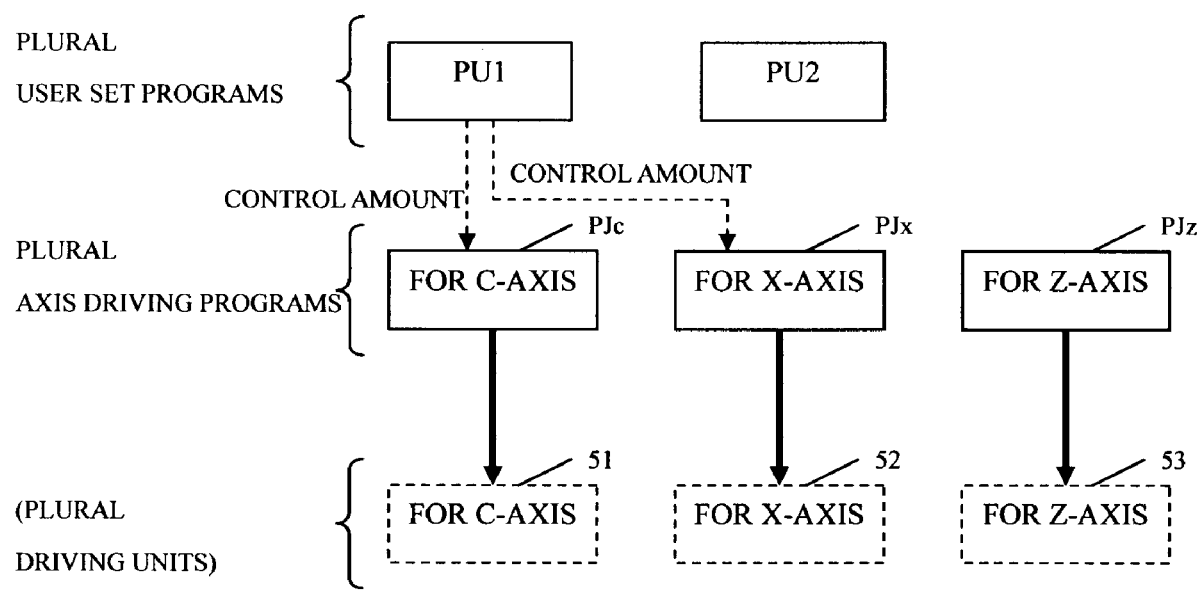
FIG. 3 is an explanatory diagram for programs of the numerical controller.
Figure 4A:
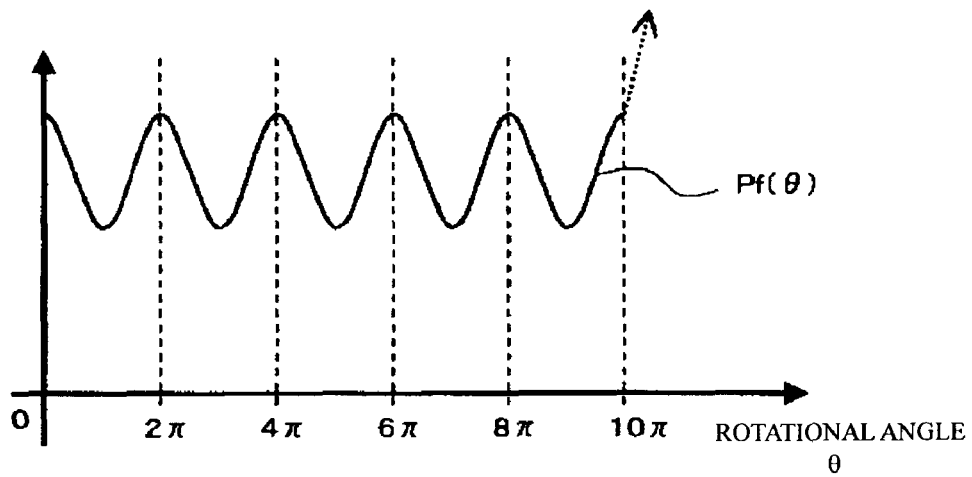
FIG. 4A shows the position chart of the conventional grinding wheel during only the C-X profile motion of the C-axis and X-axis without the infeed motion.
Figure 4B:
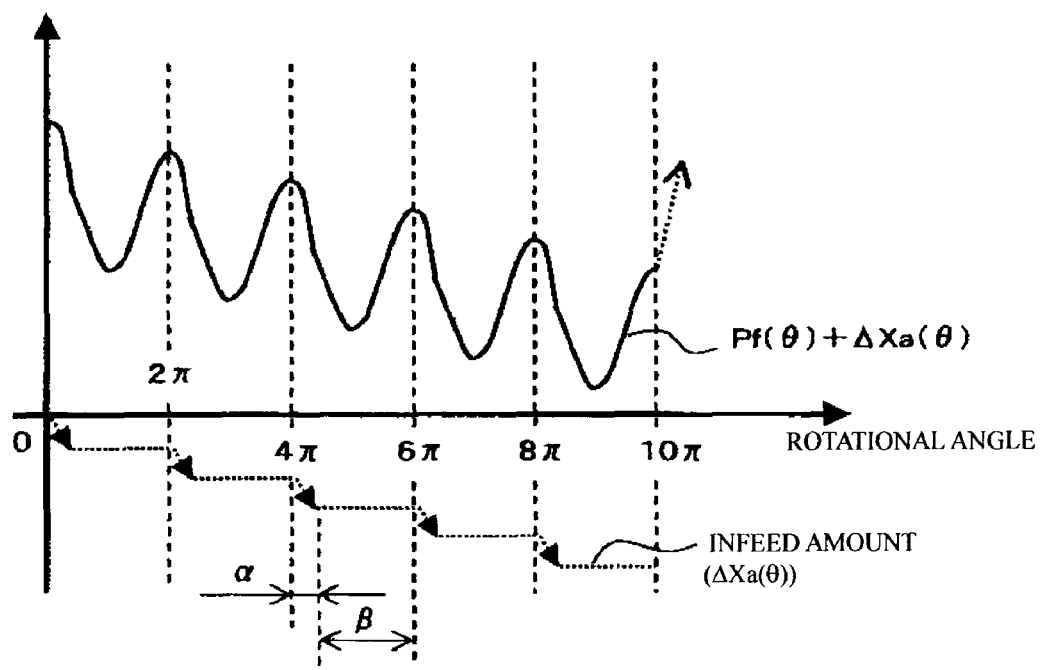
FIG. 4B shows a position chart of the conventional grinding wheel according to the motion to infeed the cutting tool by the amount of predetermined distances ($\Delta X$) at short angular distances of one revolution of the cam shaft around the C-axis with the C-X profile motion between the C-axis and the X-axis.

The conventional cutting method based on the transferring and copying method of the profile as explained before can not execute the cutting method of simultaneously two infeed motions to infeed the grinding wheel along the X-axis during the C-X profile motion, and to infeed the grinding wheel along the X-axis along the arc profile of the workpiece during the motion along the Z-axis as shown in FIG. 7. That is because the program calculating the control amount of the X-axis has been written in the user set program for identifying the X-axis as shown in FIG. 2 so that another user set program can not write the control amount of X-axis for identifying the X-axis. Neither the conventional user set program shown in FIG. 2 can write the cutting method to infeed the grinding wheel along the X-axis along the arc profile of the workpiece during the motion along the Z-axis in the same time of the C-X profile motion.

And another writing method of conventional user set program is to add a distance Z along the Z-axis in the file of P2345 in which the distances X according to the rotational angle θ are registered for each predetermined rotations so that it is fixed both of the positions along the X-axis and the Z-axis according to the rotational angle θ. In this another writing method, it is happed to remain the non-ground portion because of a large spiral motion having a large distances when the moving distance is long along the Z-axis.

Therefore, the present invention introduces a virtual axis in order to be able to control at least one axis of controlled axes (for example the C-axis, the X-axis, the Z-axis) by a plurality of user set programs. Where the user or the operator writes the next or second and latter user set programs to control the duplicate controlled axis controlled by plural user set programs in the first embodiment of the present invention, it is pointed the virtual axis virtually controlled by only own user set program to write the virtual axis in replace of the duplicate axis. Of course, there is no virtual axis in real. After the control amount of the virtual axis is calculated by the user set program having the virtual axis, this calculated control amount of virtual axis is added as the control amount input to the axis driving program for the real axis before replacing it to the virtual axis.

Figure 8:
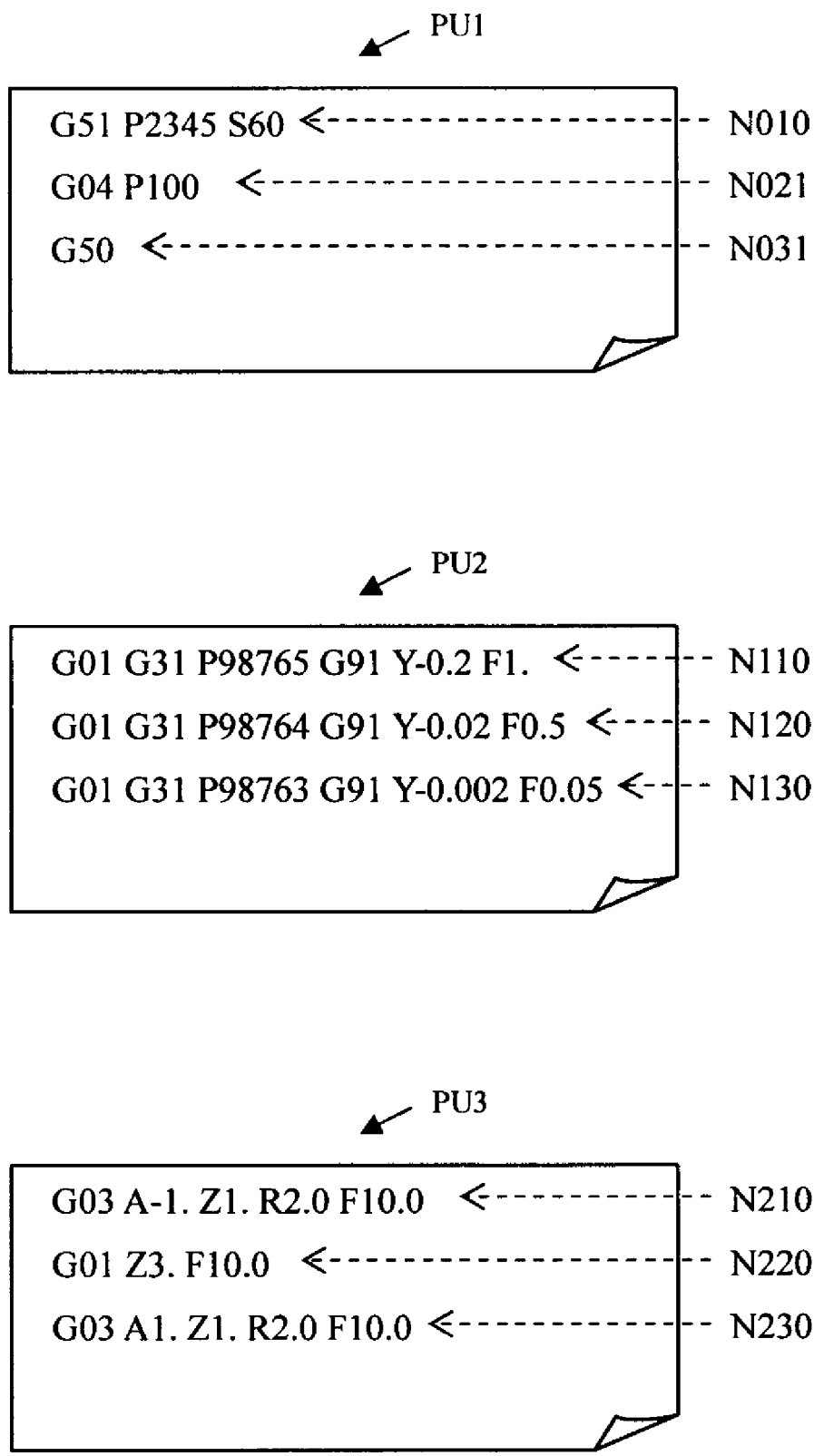
FIG. 8 is an explanatory diagram to write the user set program according to the embodiment of the present invention.

The writing method of user set program will be written as shown in FIG. 8. FIG. 8 shows the user set programs PU1, PU2, PU3 and written contents and the operation of the CPU 41 will be explained hereinafter.

The written contents of the beginning user set program PU1 and the operation of the CPU 41 will be explained at first, where the user set program PU1 is correspondent to the user set program relating to the C-X axes.

The CPU 41 reads a step N010 and recognizes an identification of the C-X profile motion start mode based on "G51". And also the CPU 41 commands to rotate the crankshaft 10 at 60 rounds per minutes based on the "S60" and it recognizes an command to control the wheel table driving motor 22 to position the surface of the grinding wheel 30 at the position along the X-axis according to the rotational angular position around the C-axis based on datum of the rotational angular position around the C-axis and the position along X-axis registered in a file "P2345" and it also calculates the control amount around C-axis and the control amount along X-axis. This is the same process explained as the Step N010 of the conventional method in FIG. 2.

Next, the CPU 41 reads a Step N021 and recognizes a sparkout mode based on "G04", and recognizes a command to perform the sparkout motion at 100 revolutions around the C-axis.

After the CPU 41 performed the sparkout motion at the 100 revolutions, it reads a Step N031 and recognizes a profile motion termination mode based on "G50" and it stops the C-X profile motion along the X-axis and around the C-axis.

Then, the written contents of the next or second user set program PU2 and the operation of the CPU 41 will be explained, where the user set program PU2 is correspondent to the user set program relating to the X-axis. The user wants to write the infeed motion of the X-axis in the user set program PU2, and however the X-axis has been already written in the beginning user set program PU1 so that he or she can not write the user set program to identify the X-axis. Therefore, the virtual axis as Y-axis is written to be replaced for the letter of X-axis as the duplicated controlled axis.

The CPU 41 reads the Step N110 and recognizes both of the infeed mode and outside positioning mode based on "G01" and "G31". Then, it recognizes relative positioning command mode according to "G91" based on "G91 Y-0.2 F1." and recognizes the command to infeed the wheel table driving motor 22 along the Y-axis at the amount of 0.2 mm in the infeed speed 1 mm/min, calculating the control amount along Y-axis.

The CPU 41 reads a next Step N120 after a detected signal registered in an address 98765 is output from the unillustrated sizing device. Besides, the latest sizing device can follow a locus of the motion of the crankpin 11 to detect the ground size of the diameter of the crankpin 11 in any angular position.

The CPU 41 reads the Step N120 and recognizes both of the infeed mode and outside positioning mode based on "G01" and "G31". Then, it recognizes relative positioning command mode according to "G91" based on "G91 Y-0.02 F0.5" and recognizes the command to infeed the wheel table driving motor 22 along the Y-axis at the amount of 0.02 mm in the infeed speed 0.5 mm/min, calculating the control amount along Y-axis.

A process of a Step N130 is similar to one of the Step N120 to be omitted to explain.

Next, it will be explained about an operation of the CPU and written contents of the third or later user set program PU3 shown in FIG. 8. This user set program PU3 is correspondent to the use set program related to X, Z axes. An A-axis that is a second virtual axis is written in the user set program PU3 in replace of the letter of X-axis written already in the beginning user set program PU1 even though the user wants to write the letter of X-axis in the user set program PU3 in order to move along the X-axis according to the motion of the Z-axis which performs the arc profile motion of the grinding wheel along the recess arc portion of the crankpin 11.

The CPU 41 reads a Step N210 and recognizes the arc motion mode based on "G03" where "G03" is pre-registered as the arc motion mode. The arc motion is the arc motion for the recess. And the CPU 41 recognizes the motion of −1 mm along the A-axis in virtual and along the X-axis in real, 1 mm from a present position along the Z-axis along the arc of a radius (R) 2.0 mm in the speed (F) 10 mm/min based on "A-1. Z1. R2.0 F10.0". The −1 mm means the position moved 1 mm upper direction of FIG. 7 and the 1 mm means the position moved 1 mm to a left direction in FIG. 7. The CPU 41 calculates the control amounts of the A-axis and the Z-axis. The arc motion created by the Z-axis and the A-axis in virtual, the X-axis in real, the grinding wheel 30 is moved along the arc profile of the end portion 11C of the crankpin 11 in FIG. 7.

After the Step N210 is processed, that is to say the grinding wheel 30 reaches the commanded position, the CPU 41 reads a Step N220 and recognizes the infeed motion mode based on "G01". And the CPU 41 recognizes the motion of 3 mm along the Z-axis in the speed (F) 10 mm/min "Z3. F10.0". The CPU 41 calculates the control amount of the Z-axis. The arc motion created by the Z-axis and the A-axis in virtual, the X-axis in real, the grinding wheel 30 is moved along the straight profile of the straight portion 11B of the crankpin 11 in FIG. 7.

After the Step N220 is processed, that is to say the grinding wheel 30 reaches the commanded position, the CPU 41 reads a Step N230 and recognizes the recess arc motion mode based on "G03". And the CPU 41 recognizes the motion of 1 mm along the A-axis in virtual and along the X-axis in real, 1 mm from a present position along the Z-axis along the arc of a radius (R) 2.0 mm in the speed (F) 10 mm/min based on "A1. Z1. R2.0 F10.0". The 1 mm along the A-axis means the position moved 1 mm under direction of FIG. 7 and the 1 mm along the A-axis means the position moved 1 mm to the left direction in FIG. 7. The CPU 41 calculates the control amounts of the A-axis and the Z-axis. The arc motion created by the Z-axis and the A-axis in virtual, the X-axis in real, the grinding wheel 30 is moved along the arc profile of the end portion 11C of the crankpin 11 in FIG. 7.

In the above-mentioned user set programs PU1, PU2, PU3, the control amount of the virtual axis Y-axis is calculated instead of the duplicated X-axis in the next user set program PU2 and the control motion of the virtual axis A-axis is calculated instead of the duplicated X-axis in the later user set program PU3 so that these control amounts are added as the control amount of the X-axis to a X-axis driving program Pjx.

Figure 9:
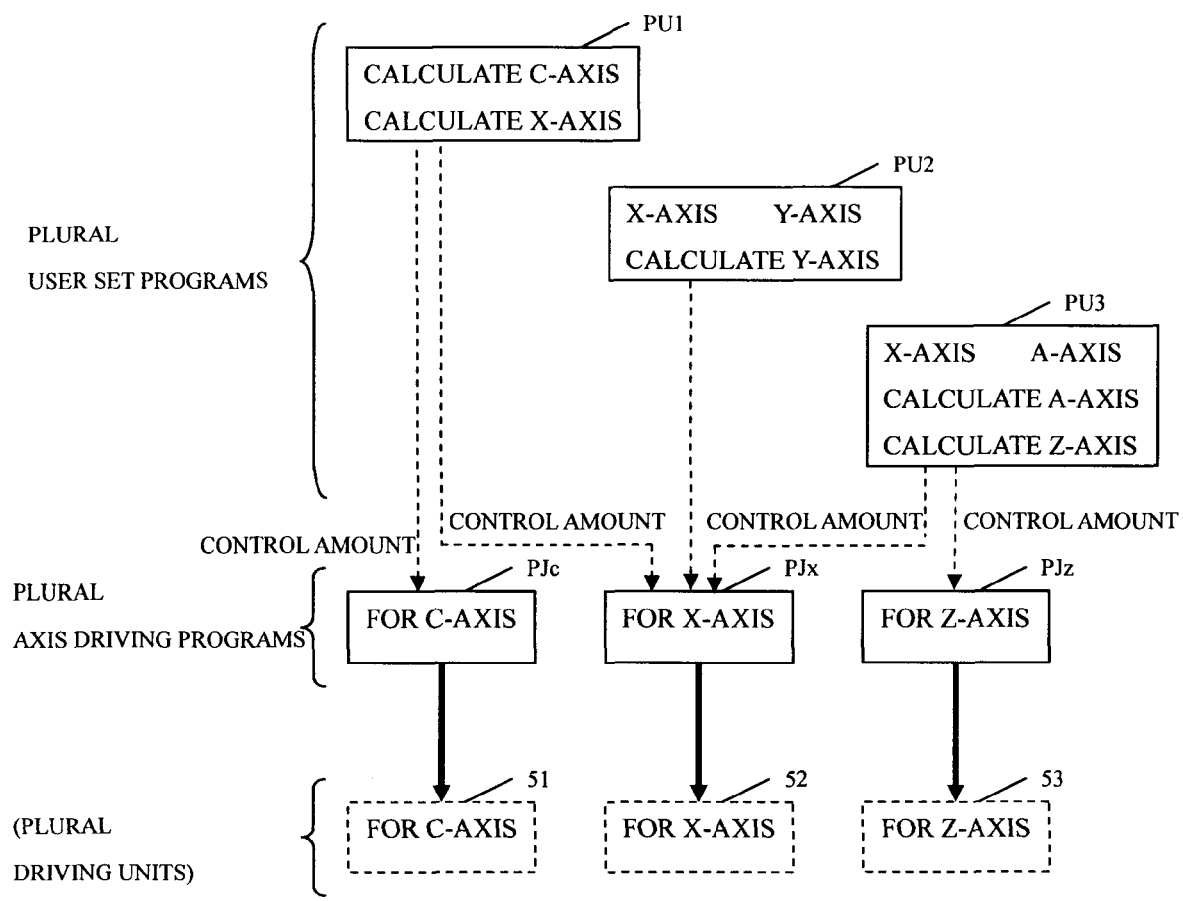
FIG. 9 is an explanatory diagram to input the control amount calculated by each of the user set program to the correspondent axis driving program.

As shown in FIG. 9, the control amount of C-axis calculated in the user set program PU1 is input into the C-axis driving program Pjc. In the X-axis driving program Pjx are input the control amount of the X-axis calculated in the beginning user set program PU1, the control amount of the Y-axis calculated in the next user set program PU2 and the control amount of the A-axis calculated in the later user set program PU3. The control amount of the Z-axis calculated in the user set program PU3 is input in an axis driving program Pjz. As a result, the first embodiment of the present invention can perform the profile motion along the peripheral profile of the crankpin 11 and the infeed motion along the X-axis during the performance of the C-X profile motion.

As explained in the first embodiment of the present invention, the C-X profile motion of the C-axis and the X-axis is identified in the user set program PU1, the infeed motion of the X-axis is identified in the user set program PU2 and the arc profile motion of the X-axis and the Z-axis is identified in the user set program PU3, in another example, however, the user set program PU2 may be omitted and it may perform the arc profile motion of the X-axis and the Z-axis independent to the C-X profile motion in the user set program PU1 and the user set program PU3.

Second Embodiment of the Present Invention

The former publication of Tokkaisho 63-84845 discloses the step cutting method for the non-circular workpiece for grinding the cam to infeed the cutting tool by the amount of predetermined distances (ΔX) at short angular distances of one revolution of the cam shaft around the C-axis with the C-X profile motion. In this conventional cutting method, there is the possibility to occur the previously mentioned problem.

Therefore, in the second embodiment of the present invention, it will be explained the cutting machine having a continuous infeed at all peripheral position of the crankpin without concerning about the specific rotational angular position of the workpiece during the C-X profile motion of the C-axis and the X-axis by writing and performing individually different user set programs of the C-X profile motion of the C, X axes and the infeed motion along the X-axis in grinding the crankpin.

In the explanation of the second embodiment, there are omitted parts concerning about controllers along the Z-axis, for example the workpiece table driving motor 23, the position detect sensor 23E, the feed screw 23B, the driving unit 53, and so on, in the cutting machine 1 in FIG. 5 because there are no motion along the Z-axis. However, the cutting machine 1 provides the unillustrated sizing device to measure the dimensions of the workpiece continuously.

Examples (1) to (3) of the Second Embodiment of the Present Invention

An old sizing device checks whether it reaches the preset value or not, however, a latest sizing device can check the real actual size of the workpiece so that it is possible for us to check the actual profile of the workpiece by the latest sizing device. The cutting machine 1 will be explained by using the latest sizing device and a program explained hereinafter to achieve the infeed motion of a stable load by the continuous infeeding.

The second embodiment of the present invention has two user set programs writing the program to command the C-X profile motion of the C, X axes in one user set program and the program to command the infeed motion along the X-axis in accordance with the real actual size of the workpiece in another user set program. This infeed motion is for example to infeed the grinding wheel with a first speed until the size of the workpiece reaches to the first predetermined size.

First Example of the Second Embodiment;
Continuous Infeed at all Peripheral Angular Position Around the C-Axis The first example writes in accordance with the user set programs PU1, PU2 as shown in FIG. 8.

In this example, the control of the X-axis is duplicated in two user set programs so that the other user set program, for example the user set program PU2 in FIG. 8, writes the virtual Y-axis in replace of the duplicated X-axis.

Besides, to the X-axis driving program Pjx is input the control amount of the virtual Y-axis calculated by the user set program PU2 with adding to the control amount of the X-axis calculated by one use set program PU1.

The grinding wheel 30 is, thereby, infed continuously by the first speed at any peripheral point of the crankpin 11 in spite of its angular position around the C-axis until the size of the workpiece reaches to the predetermined first size detected by the latest sizing device.

The Step N110 of the user set program PU2 as shown in FIG. 8 writes the first speed of F1.0 until the ground size of the workpiece reaches to the first predetermined size, and after reaching the first predetermined size the Step N120 writes the second slower speed of F0.5 than the first speed until the ground size of the workpiece reaches to the second smaller predetermined size than the first predetermined size. After reaching the second predetermined size, the Step N130 writes the third slower speed of F0.05 than the second speed until the ground size of the workpiece reaches to the third smaller predetermined size than the second predetermined size. Thereby, the finishing accuracy of the ground workpiece is gradually graded up in a coarse grinding, a precise grinding and a micro grinding.

Figure 10A:
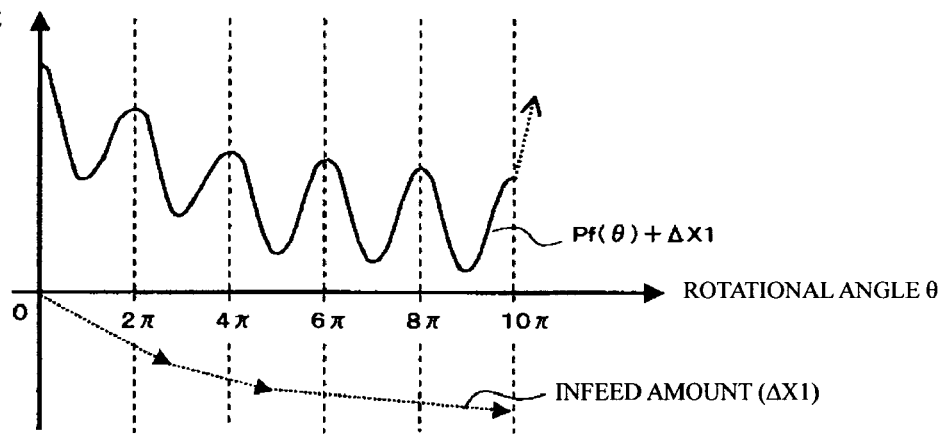
FIG. 10A is a schematic chart of the infeed motion along the X-axis with the C-X profile motion according to a second embodiment of the present invention.

The position of the grinding wheel 30 in the above-mentioned operation is shown in a graph of FIG. 10A. The position of the center T of the grinding wheel 30 is shown as Pf(θ) that is continuously and evenly infed to the center J of the workpiece 10 in spite of the rotational angle θ of the workpiece 10 by the infeed amount ΔX1. The first example of the second embodiment of the present invention results to restrain a deterioration of circularity and the generation of the step on the ground surface of the workpiece 10 so that this performs to finish in higher accuracy of the ground surface. And also, this example reduces the grinding load by infeeding continuously and evenly to reduce the consumption of the grinding wheel 30.

Second Example of the Second Embodiment; First Process at a Change of Infeed Speed The second example of the second embodiment of the present invention writes to retract temporally the grinding wheel 30 from the workpiece 10 in order to separate the grinding wheel 30 after the size of the ground portion of the workpiece 10 reaches to the second predetermined size and before infeeding at next speed in any user set programs PU1, PU2 or other user set program. This temporal retraction is called as a back off.

By this written command, the grinding wheel 30 infeed continuously and evenly at the second infeed speed to the workpiece in spite of the rotational angle until the size of the workpiece reaches the second predetermined size and after reaching, the grinding wheel 30 is separated temporally from the workpiece. Then, the grinding wheel 30 infeed continuously and evenly at the third predetermined speed until the size of the workpiece reaches the third predetermined size in spite of the rotational angle of the workpiece.

Figure 10B:
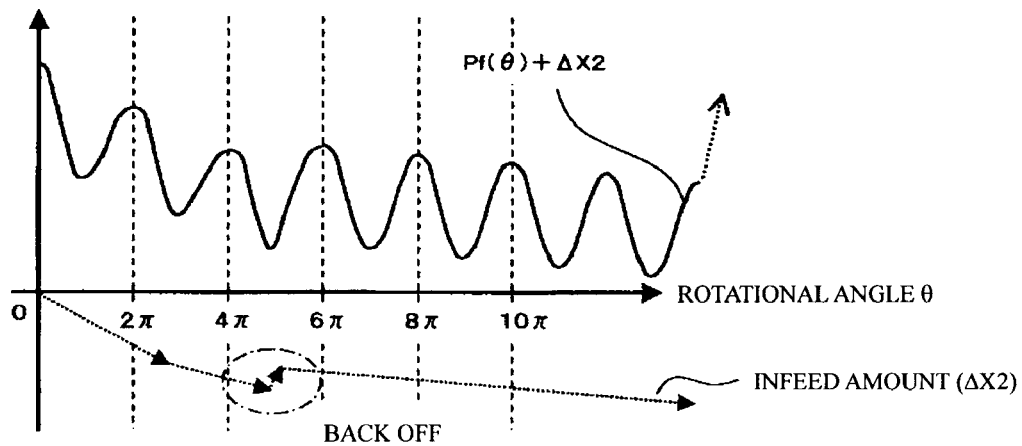
FIG. 10B is another schematic chart of the infeed motion along the X-axis with the C-X profile motion according to the second embodiment of the present invention.

The position of the grinding wheel 30 in the above-mentioned operation is shown in a graph of FIG. 10B. The position of the center T of the grinding wheel 30 is shown as Pf(θ) that is continuously and evenly infed to the center J of the workpiece 10 in spite of the rotational angle θ of the workpiece 10 by the infeed amount ΔX2. The second example of the second embodiment of the present invention results an elimination of a deflection et al of the workpiece by the back off motion to separate temporally the grinding wheel 30 from the workpiece in addition to the motion shown in FIG. 10A to make the ground accuracy high.

Third Example of the Second Embodiment; Second Process at a Change of Infeed Speed Third example of the second embodiment of the present invention adds a filtering process or smoothing process to the control amount calculated by the user set program PU2 of the first example of the second embodiment to input to the X-axis driving program Pjx. If the filtering process is performed in the control amount calculated by the user set program of the conventional process shown in FIG. 2, the filtering process is available to the C-X profile motion to make the C-X profile worse. On the other hand, the filtering process of the third example is performed to only the infeed motion because the user set program PU1 of the C-X profile and the user set program PU2 of the infeed motion are separately constructed.

In concerning about the filtering process, the grinding wheel 30 infeed continuously and evenly at the first infeed speed to the workpiece in spite of the rotational angle until the size of the workpiece reaches the first predetermined size and after reaching, the infeed speed is gradually or smoothly reduced from the first speed to the second speed by the filtering process. And then, the grinding wheel 30 infeed continuously and evenly at the second infeed speed to the workpiece in spite of the rotational angle until the size of the workpiece reaches the second predetermined size and after reaching, the infeed speed is gradually or smoothly reduced from the second speed to the third speed by the filtering process.

Figure 10C:
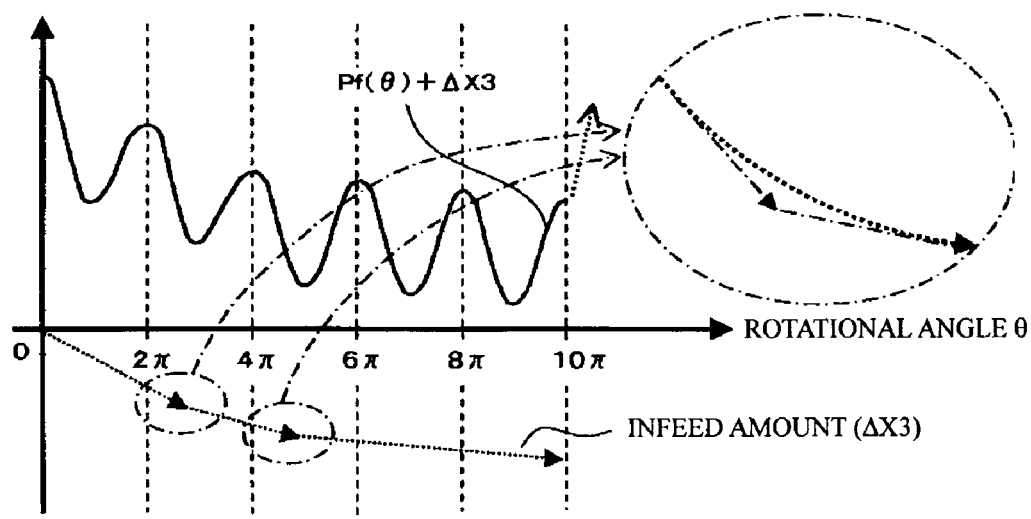
FIG. 10C is yet another schematic chart of the infeed motion along the X-axis with the C-X profile motion according to the second embodiment of the present invention.

The position of the grinding wheel 30 in the above-mentioned operation is shown in a graph of FIG. 10C. The position of the center T of the grinding wheel 30 is shown as Pf(θ) that is continuously and evenly infed to the center J of the workpiece 10 in spite of the rotational angle θ of the workpiece 10 by the infeed amount ΔX2. The third example of the second embodiment of the present invention results higher accuracy of the ground surface by changing the infeed speed smoothly at the changing point of the infeed speed.

In the above-mentioned embodiments, the cutting tool is explained as the grinding wheel 30 having an almost cylindrical form, the workpiece is explained as the crankshaft 10 and the ground portion is explained as the crankpin 11, however, this invention is not limited to these parts but it is applicable to various cutting tools, workpieces, the cut portions.

And also, in the above-mentioned embodiments, the grinding wheel 30 is infed toward the workpiece along the X-axis, the workpiece may be infed toward the grinding wheel 30 along the X-axis. Therefore, X-axis driving device is to move the grinding wheel 30 to the workpiece relatively.

For the same way in the Z-axis, the grinding wheel 30 is moved toward the workpiece along the Z-axis, the workpiece may be moved toward the grinding wheel 30 along the Z-axis. Therefore, Z-axis driving device is to move the grinding wheel 30 to the workpiece relatively.

While the invention has been described in detail with reference to the preferred embodiment, it will be apparent to those skilled in the art that the invention is not limited to the present embodiment, and that the invention may be realized in various other embodiments within the scope of the claims.

What is claimed is:

1. In a program writing method of a numerical controller having a written program to command a motion of each of plural axes installed in a cutting machine;

said program has a single or plural user set programs calculating a control amount of an identified axis and a single or plural axis driving programs prepared for each axis to be input to said control amount calculated by said user set programs to drive a driving device of each axis;

said plural user set programs are independently and in parallel processed where said single or plural user set programs are plural user set programs;

each user set program is written to calculate said control amount of single or plural axes identified in random by each user set program, and each axis identified by said user set program is individually identified by only one user set program; and said axis driving program outputs a driving signal to said driving device related to said axis driving program in accordance with said input control amount;

said program writing method comprising the steps of:

in order to control at least one axis of said controlled axes by plural user set programs, identifying a virtual axis controlled virtually by only one user set program in the second and later user set programs controlling a duplicated axis that is controlled by said plural user set programs;

writing said virtual axis in place of said duplicated axis in the second and later user set program; and adding a control amount calculated by said user set program identifying said virtual axis to said correspondent axis driving program as said control amount of said duplicated axis before replacing to said virtual axis.

2. A program writing method of said numerical controller according to claim 1, wherein said cutting machine has two axes, one axis is a C-axis around which a workpiece is rotated and the other axis is an X-axis along which a cutting tool is moved relatively to said workpiece;

one of said plural user set programs is to control a C-X profile motion around said C-axis and along said X-axis; and the other of said plural user set programs is to control an infeed motion of said cutting tool relative to said workpiece along said X-axis.

3. A program writing method of said numerical controller according to claim 2, wherein said cutting machine further has a Z-axis along which said cutting tool is moved relatively to said workpiece; and another user set program controls a profile motion of said cutting tool relatively to said workpiece including at least straight movement along said X-axis and/or said Z-axis.

4. In a numerical controller having a written program to command a motion of each of plural axes installed in a cutting machine and controlling said plural axes;

said program has a single or plural user set programs calculating a control amount of said identified axis and a single or plural axis driving programs prepared for each axis to be input to said control amount calculated by said user set programs to drive a driving device of each axis;

said plural user set programs are independently and in parallel processed where said single or plural user set programs are plural user set programs;

each user set program is written to calculate said control amount of single or plural axes identified in random by each user set program, and each axis identified by said user set program is individually identified by only one user set program; and said axis driving program outputs a driving signal to said driving device related to said axis driving program in accordance with said input control amount;

said numerical controller further comprising:

in order to control at least one axis of said controlled axes by plural user set programs, a virtual axis identified to be virtually controlled by only one user set program in the second and later user set programs controlling a duplicated axis that is controlled by said plural user set programs;

said virtual axis is written in place of said duplicated axis in the second and later user set program; and said control amount calculated by said user set program identifying said virtual axis is added to said correspondent axis driving program as said control amount of said duplicated axis before replacing to said virtual axis.

5. A numerical controller according to claim 4, wherein said cutting machine has two axes, one axis is a C-axis around which a workpiece is rotated and the other axis is an X-axis along which a cutting tool is moved relatively to said workpiece;

one of said plural user set programs is to control a C-X profile motion around said C-axis and along said X-axis; and the other plural user set program is to control an infeed motion of said cutting tool relative to said workpiece along said X-axis.

6. A numerical controller according to claim 5, wherein said cutting machine further has a Z-axis along which said cutting tool is moved relatively to said workpiece; and another user set program controls a profile motion of said cutting tool relatively to said workpiece including at least straight movement along said X-axis and/or said Z-axis.

7. In a cutting machine having the numerical controller providing the program written by the program writing method according to claim 1 or the numerical controller according to claim 4;

a C-axis driving device to rotate a workpiece around a C-axis, a position of a peripheral surface of said workpiece is variable according to a rotational angle of said workpiece;

a cutting tool cutting said peripheral surface of said workpiece; and an X-axis driving device infeeding said cutting tool relative to said workpiece along an X-axis perpendicular to said C-axis;

said cutting machine further comprising;

a user set program relating to said X-axis to command an infeed motion of said cutting tool along said X-axis relative to said workpiece; and a user set program relating to said C, X axes to command a C-X motion of said cutting tool along said X-axis relative to said workpiece according to a rotational angle around said C-axis;

in order to control said X-axis of a duplicated controlled axis by two user set programs, a virtual axis is identified to be virtually controlled by only one user set program in the second and later user set programs controlling said duplicated controlled axis that is controlled by said two user set programs;

said virtual axis is written in place of said duplicated axis in the later user set program; and a control amount calculated by said user set program identifying said virtual axis is added to a control amount of the X-axis calculated by a remaining user set program and a sum of added control amounts is input to said X-axis driving program.

8. A cutting machine according to claim 7, further comprising a sizing device measuring a size of said workpiece continuously in spite of a rotational angle of said workpiece around said C-axis, said user set program relating to said X-axis writes a command to infeed continuously and evenly said cutting tool relatively to said workpiece at any angular position of said workpiece at a first speed until said size of said cut workpiece reaches a first predetermined amount based on a signal from said sizing device.

9. A cutting machine according to claim 8, said user set program relating to said X-axis writes a command to infeed continuously and evenly said cutting tool relatively to said workpiece at any angular position of said workpiece at a second slower speed than said first speed until said size of said cut workpiece reaches a second predetermined amount smaller than said first predetermined amount based on said signal from said sizing device after said size of said workpiece reaches said first predetermined size, said user set program relating to said X-axis further writes a command to retract said cutting tool relatively to said workpiece along said X-axis in order to separate said cutting tool from said workpiece temporarily after said size of said workpiece reaches said first predetermined size before infeed of said cutting tool at said second speed.

10. A cutting machine according to claim 8, said user set program relating to said X-axis writes a command to infeed continuously and evenly said cutting tool relatively to said workpiece at any angular position of said workpiece at a second slower speed than said first speed until said size of said cut workpiece reaches a second predetermined amount smaller than said first predetermined amount based on said signal from said sizing device after said size of said workpiece reaches to said first predetermined size, said control amount calculated by said user set program relating to said X-axis is added to said control amount as input to said X-axis driving program after a filtering process is added to said control amount calculated by said user set program relating to said X-axis in order to change gradually from said first speed to said second speed to cut said workpiece by said cutting tool.

11. A cutting machine according to claim 7, further comprising:
   a Z-axis driving device moving said workpiece relative to said cutting tool along a Z-axis parallel to said C-axis; and
   a user set program relating to said X, Z axes to command a motion of said workpiece along said Z-axis relative to said cutting tool in relation to a motion of said cutting tool along said X-axis relative to said workpiece;
   said virtual axis is identified to be virtually controlled by only one user set program in the next and later user set programs controlling said duplicated axis that is controlled by said two or three user set programs, where said next user set program is written after a beginning user set program is written;
   said control amount calculated by said user set program identifying said virtual axis is added to a control amount of the X-axis calculated by said remaining one or two user set programs and a sum of added control amounts is input to said X-axis driving program.

12. A cutting machine according to claim 11, further comprising a sizing device measuring a size of said workpiece continuously in spite of a rotational angle of said workpiece around said C-axis, said user set program relating to said X-axis writes a command to infeed continuously and evenly said cutting tool relatively to said workpiece at any angular position of said workpiece at a first speed until said size of said cut workpiece reaches a first predetermined amount based on a signal from said sizing device.

13. A cutting machine according to claim 12, said user set program relating to said X-axis writes a command to infeed continuously and evenly said cutting tool relatively to said workpiece at any angular position of said workpiece at a second slower speed than said first speed until said size of said cut workpiece reaches a second predetermined amount smaller than said first predetermined amount based on said signal from said sizing device after said size of said workpiece reaches said first predetermined size, said user set program relating to said X-axis further writes a command to retract said cutting tool relatively to said workpiece along said X-axis in order to separate said cutting tool from said workpiece.

14. A cutting machine according to claim 12, said user set program relating to said X-axis writes a command to infeed continuously and evenly said cutting tool relatively to said workpiece at any angular position of said workpiece at a second slower speed than said first speed until said size of said cut workpiece reaches a second predetermined amount smaller than said first predetermined amount based on said signal from said sizing device after said size of said workpiece reaches said first predetermined size, said control amount calculated by said user set program relating to said X-axis is added to said control amount input to said X-axis driving program after a filtering process to said control amount calculated by said user set program relating to said X-axis in order to change gradually from said first speed to said second speed to cut said workpiece by said cutting tool.

15. In a grinding machine having the numerical controller providing the program written by the program writing method according to claim 1 or the numerical controller according to claim 4;
   a C-axis driving device to rotate around a C-axis a crankpin of a crankshaft, a position of a peripheral surface of said crankpin is variable according to a rotational angle of said crankpin;
   a grinding wheel grinding said peripheral surface of said crankpin;
   an X-axis driving device infeeding said grinding wheel relative to said crankpin along an X-axis perpendicular to said C-axis; and
   a Z-axis driving device moving said crankpin relative to said grinding wheel along a Z-axis parallel to said C-axis;
   said grinding machine further comprising;
   a user set program relating to said X-axis to command an infeed motion of said grinding wheel along said X-axis relative to said crankpin; and
   a user set program relating to said C, X axes to command a C-X motion of said grinding wheel along said X-axis relative to said crankpin according to a rotational angle around said C-axis;
   a user set program relating to said X, Z axes to command a motion of said crankpin along said Z-axis relative to said grinding wheel in relation to a motion of said grinding wheel along said X-axis relative to said crankpin;
   in order to control said X-axis of a duplicated axis by said two or three user set programs, a virtual axis is identified to be virtually controlled by only one user set program in the next or later user set program controlling said duplicated axis that is controlled by said two or three user set programs, where said next user set program is written after a beginning user set program is written;
   said virtual axis is written in place of said duplicated axis in the next or later user set program; and
   a control amount calculated by said user set program identifying said virtual axis is added to a control amount of the X-axis calculated by said remaining one or two user set programs and a sum of added control amounts is input to said X-axis driving program.

16. A grinding machine according to claim 15,
   further comprising a sizing device measuring a size of said crankpin continuously in spite of a rotational angle of said crankpin around said C-axis, said user set program relating to said X-axis writes a command to infeed continuously and evenly said grinding machine relatively to said crankpin at any angular position of said crankpin at a first speed until said size of said cut crankpin reaches a first predetermined amount based on a signal from said sizing device.

* * * * *